Sept. 15, 1931.   G. P. WOOD ET AL   1,823,076
BEEHIVE
Filed Feb. 3, 1923
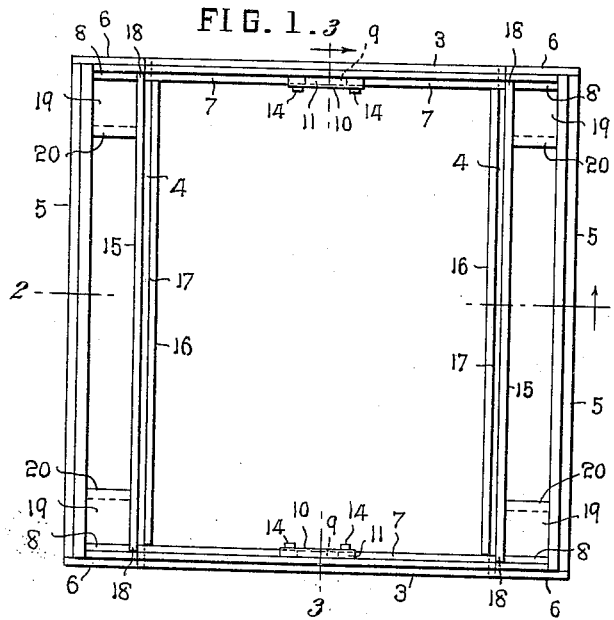
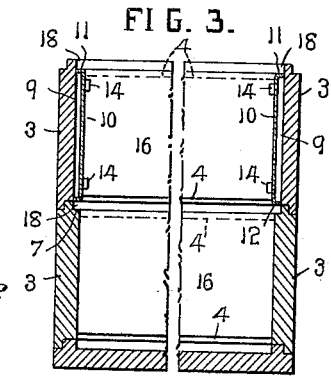
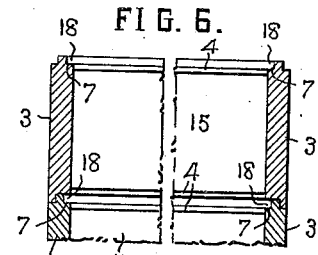
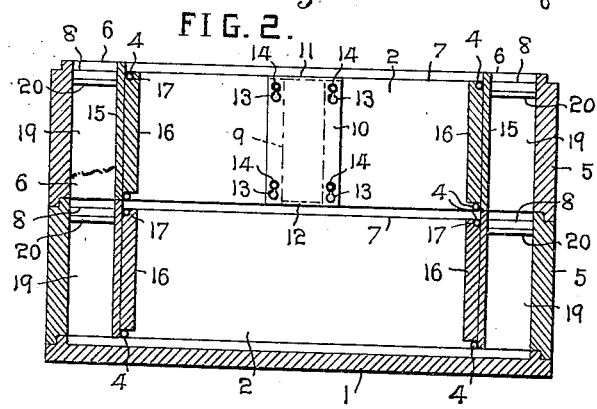
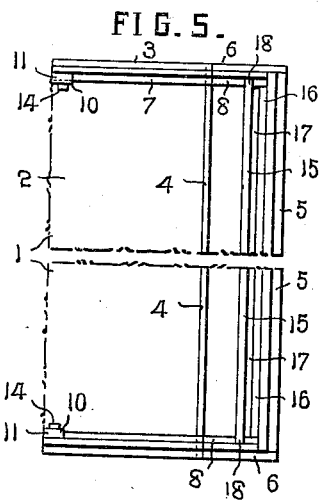
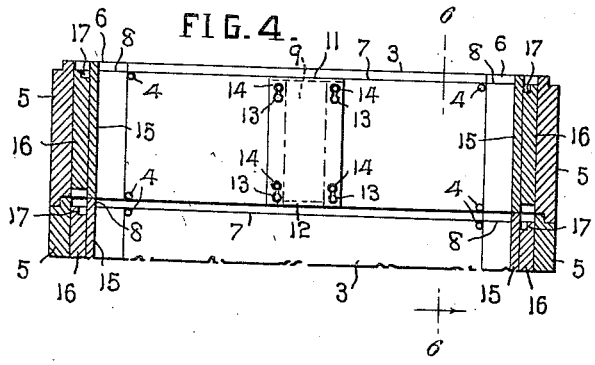
GEORGE P. WOOD AND
JAMES WOOD
*Inventor*
By Ogle R. Singleton
*Attorney*

Patented Sept. 15, 1931

1,823,076

UNITED STATES PATENT OFFICE

GEORGE P. WOOD AND JAMES WOOD, OF PEEKSKILL, NEW YORK

BEEHIVE

Application filed February 3, 1923. Serial No. 616,856.

Our invention relates to improvements in the construction of movable-frame sectional beehives of the general type shown and described in patents of George P. Wood, No. 1,068,196 granted July 22, 1913, No. 1,146,044 granted July 13, 1915, and No. 1,203,675, granted November 7, 1916. Also in application of George P. Wood for patent, Serial Number 353,387 filed January 23, 1920, each of said patents and application having for its principal object the construction and use of rectangular movable-frame hive-sections which may individually be complete compartments adapted to be placed one upon another, and in which such provision is made that when detachable walls are removed and they are combined with one or more like hive-sections in one story, bees can pass freely from one to another; with bottoms, covers and other accessories. Many of the details are adapted for use in the construction of beehives of other types.

The object of our invention is to provide for the most economical manufacture of beehives of the type described, that are strong, thoroughly weatherproof and most adaptable for all requirements of beekeeping. We attain this object by the means illustrated in the accompanying drawings, in which:

Fig. 1 is a top plan view of our improved hive, the cover being removed.

Fig. 2 is a vertical section on the line 2—2 of Fig. 1.

Fig. 3 is a vertical section on the line 3—3 of Fig. 1.

Fig. 4 is a vertical section similar to Fig. 2.

Fig. 5 is a top plan view of the parts as shown in Fig. 4.

Fig. 6 is a vertical section on the line 6—6 of Fig. 4.

As illustrated in the drawings, our improved hive has the bottom 1 and superposed hive sections 2. Each of these sections 2 has the fixed walls 3 connected by the grid rods 4, and the removable walls 5 with end members 6 which are fixed on the removable walls 5 and may be detachably fastened to the fixed walls 3 by any suitable means. As indicated in Fig. 1, it is obvious that the walls 3, 3 and 5, 5 compose a rectangular hive section and that each section may be used independently with the bottom 1 and a cover, or a plurality of such sections may be used with the bottom 1 and a cover. It is to be understood that we provide suitable interlocking tongues and rabbets upon the abutting edges of the bottom 1 and section 2 so that weatherproof joints between the parts will be effected.

Each of the fixed walls 3 is provided on its inner face adjacent its upper edge with a rabbeted shelf 7, and the end members 6 of the walls 5 have shelves 8 aligned with the shelves 7. These shelves 7 and 8 are designed to serve as supports for the projections of the hangers of frames or honey section cases to be positioned in the hive section.

When two or more hive sections 2 are to be used, we provide those above the lowest section 2 with vertical slots 9 in the fixed walls 3 to permit the projections of the hangers to pass downwardly through the upper sections 2 to reach the shelves 7 and 8 on which they are to rest. We provide removable plates 10 to cover the slots 9, provided with upper and lower flanges 11 and 12 respectively to register with the upper and lower edges of the walls 3, and slotted openings 13 in which headed pins 14 are received to effect a slot-and-pin connection between the walls 3 and covers 10.

We provide division boards 15, each one having a wide cleat 16 having a groove 17 on one edge. These division boards 15 have on one edge projections 18 to fit into the rabbeted shelves 8 of the end members 6.

We provide blocks 19 having shelves 20, the purpose of which will presently be explained.

As illustrated in Figs. 1, 2 and 3, these division boards 15 may be so disposed that the upper grid rods 4 of each section 2 are received in the grooves 17 of the cleats 16. When the boards 15 are thus placed, we insert the blocks 19 between the walls 5 and the boards 15 and against the end members 6. The blocks 19 serve to brace the division boards 15. It is to be noted that when the division boards 15 are thus positioned and braced the upper edges of the cleats 16 form shelves to support the hangers of frames or honey section cases which may be disposed in the hive section parallel with the fixed walls 3. When the blocks 19 are thus positioned relative to the division boards 15, it is to be noted that frames or honey section cases may be hung from the shelves 20 of the blocks 19, being positioned parallel with the walls 5, or the space between the walls 5 and the boards 15 may be packed.

As illustrated in Figs. 4, 5 and 6, these division boards 15 may be reversed and positioned closely adjacent the walls 5, the blocks 19 having been removed.

Having described our invention, what we claim is:

1. In a beehive, the combination of two opposite fixed walls, each provided with a rabbeted shelf; two opposite detachable walls; end members for said detachable walls aligned with said fixed walls and each provided with a rabbeted shelf registering with one of the shelves on said fixed walls; and a division board mounted upon the shelves on each pair of said members, parallel with said detachable walls.

2. In a beehive, the combination of two opposite fixed walls, each provided with a rabbeted shelf; two opposite detachable walls; end members for said detachable walls aligned with said fixed walls and each provided with a rabbeted shelf registering with one of the shelves on said fixed walls; a division board mounted upon the shelves on each pair of said members, parallel with said detachable walls; and a cleat positioned on each division board to serve as a shelf for hangers of frames and honey section cases positioned parallel with said fixed walls.

3. In wall structure for a beehive, a board serving as the inner face of the wall and provided with a vertical groove extending entirely across said face.

4. In wall structure for a beehive, the combination of a plate board serving as the inner face of the wall and provided with a vertical groove therein; and a second plate so designed and disposed as to serve as a removable cover for said groove.

5. In wall structure for a beehive, the combination of a slotted wall; and a cover for the slot comprising a plate having a top flange and a bottom flange, the parts being so proportioned that when the cover is applied to the wall the plate is substantially flush with the surface of the wall and the flanges with the upper and the lower edges of the wall.

6. In wall structure for a beehive, the combination of a slotted wall; a cover for the slot; and slot-and-pin connections between the wall and the cover.

GEORGE P. WOOD.
JAMES WOOD.